United States Patent
Weatherhead et al.

(10) Patent No.: US 9,803,472 B2
(45) Date of Patent: Oct. 31, 2017

(54) SYSTEMS AND METHODS FOR SELF CONFIGURATION OF REMOTE TERMINAL UNITS

(71) Applicant: ROCKWELL AUTOMATION ASIA PACIFIC BUSINESS CENTER PTE. LTD., Singapore (SG)

(72) Inventors: Norman Andrew Weatherhead, Kitchener (CA); Edward Anthony Gray, Olmsted Township, OH (US)

(73) Assignee: ROCKWELL AUTOMATION ASIA PACIFIC BUSINESS CENTER PTE. LTD., Singapore (SG)

( * ) Notice: Subject to any disclaimer, the term of this patent is extended or adjusted under 35 U.S.C. 154(b) by 0 days.

(21) Appl. No.: 14/943,690

(22) Filed: Nov. 17, 2015

(65) Prior Publication Data
US 2017/0138180 A1 May 18, 2017

(51) Int. Cl.
G06Q 50/02 (2012.01)
G01V 3/00 (2006.01)
E21B 47/12 (2012.01)
H04L 29/08 (2006.01)
G06F 9/455 (2006.01)

(52) U.S. Cl.
CPC .......... *E21B 47/12* (2013.01); *G06F 9/45533* (2013.01); *H04L 67/10* (2013.01); *H04L 67/12* (2013.01)

(58) Field of Classification Search
CPC combination set(s) only.
See application file for complete search history.

(56) References Cited

U.S. PATENT DOCUMENTS

| | | | |
|---|---|---|---|
| 6,873,267 B1* | 3/2005 | Tubel | E21B 43/12 166/250.15 |
| 2013/0232480 A1* | 9/2013 | Winterfeldt | G06F 8/60 717/177 |
| 2015/0039234 A1* | 2/2015 | Abou-Sayed | G01V 99/00 702/11 |

OTHER PUBLICATIONS

U.S. Appl. No. 14/312,455, filed Jun. 23, 2014, Weatherhead et al.
U.S. Appl. No. 14/312,462, filed Jun. 23, 2014, Weatherhead et al.
U.S. Appl. No. 14/312,476, filed Jun. 23, 2014, Weatherhead et al.

* cited by examiner

*Primary Examiner* — Nabil Syed
*Assistant Examiner* — Cal Eustaquio
(74) *Attorney, Agent, or Firm* — Fletcher Yoder, P.C.

(57) ABSTRACT

A remote terminal unit (RTU) may control one or more operations a well device associated with a hydrocarbon well. The RTU may include a processor that sends one or more attributes regarding the RTU, the well device, the hydrocarbon well, or any combination thereof to a cloud-based computing system. The processor may then send model data including one or more instructions regarding cloud services to be performed by the cloud-based computing system based on data provided to the cloud-based computing system from the RTU. The processor may then send a request to perform one or more control actions for the operations of the well device to the cloud-based computing system, control the operations of the well device based on the control actions when an approval of the request is received from the cloud-based computing system, and send the data to the cloud-based computing system.

20 Claims, 7 Drawing Sheets

SYSTEMS AND METHODS FOR SELF CONFIGURATION OF REMOTE TERMINAL UNITS

BACKGROUND

The present disclosure relates generally to improving operations of a control system that monitors and controls the operation of a well device at a hydrocarbon well site. More specifically, the present disclosure relates to enabling devices to perform configuration, analysis, and commissioning services to assist in the operation of a well device at a hydrocarbon well site, control the flow of hydrocarbons from the hydrocarbon well site, and optimize the production of hydrocarbons at the hydrocarbon well site.

As hydrocarbons are extracted from hydrocarbon reservoirs via hydrocarbon wells in oil and/or gas fields, the extracted hydrocarbons may be transported to various types of equipment, tanks, and the like via a network of pipelines. For example, the hydrocarbons may be extracted from the reservoirs via the hydrocarbon wells and may then be transported, via the network of pipelines, from the wells to various processing stations that may perform various phases of hydrocarbon processing to make the produced hydrocarbons available for use or transport.

Information related to the extracted hydrocarbons or related to the equipment extracting, transporting, storing, or processing the extracted hydrocarbons may be gathered at the well site or at various locations along the network of pipelines. This information or data may be used to ensure that the well site or pipelines are operating safely and that the extracted hydrocarbons have certain desired qualities (e.g., flow rate, temperature). The data related to the extracted hydrocarbons may be acquired using monitoring devices that may include sensors that acquire the data and transmitters that transmit the data to computing devices, routers, other monitoring devices, and the like, such that well site personnel and/or off-site personnel may view and analyze the data.

In addition to monitoring the properties of the well device and the hydrocarbon well site, the monitoring devices, such as remote terminal units (RTUs), may control the operations of a well device used for extracting hydrocarbons from the hydrocarbon well site. Generally, the RTUs store and execute control programs to effect decision-making in connection with a process for controlling the operation of the well device.

However, given the remote locations in which hydrocarbon well sites are located, operators of the monitoring systems or the RTUs may not have access to technical or operational support to assist with the configuration, commission, operation, or maintenance of an RTU, a well device, or any component that may be part of the hydrocarbon well site. Accordingly, it is now recognized that improved systems and methods for configuring, commissioning, maintaining, and managing various devices at a hydrocarbon well site are desirable.

BRIEF DESCRIPTION

In one embodiment, a remote terminal unit (RTU) may control one or more operations a well device associated with a hydrocarbon well. The RTU may include a processor that sends one or more attributes regarding the RTU, the well device, the hydrocarbon well, or any combination thereof to a cloud-based computing system. The processor may then send model data including one or more instructions regarding cloud services to be performed by the cloud-based computing system based on data provided to the cloud-based computing system from the RTU. The processor may then send a request to perform one or more control actions for the operations of the well device to the cloud-based computing system, control the operations of the well device based on the control actions when an approval of the request is received from the cloud-based computing system, and send the data to the cloud-based computing system.

In another embodiment, a cloud-computing system that may be communicatively coupled with a remote terminal unit (RTU) that monitors and/or controls one or more operations of one or more well devices associated with a hydrocarbon well may include at least one processor configured to receive one or more attributes regarding the RTU, the well devices, the hydrocarbon well, or any combination thereof. The processor may then receive a control action request from the RTU, such that the control action request includes a first set of instructions that causes the RTU to adjust the operations of the well devices in a first manner. The processor may then receive model data that includes a second set of instructions associated with one or more services to be performed by the cloud-based computing system based on data provided to the cloud-based computing system from the RTU. The processor may then determine whether an impact of adjusting the operations of the well devices in the first manner is greater than a threshold, send a denial of the control request to the RTU when the impact is greater than a threshold, and perform the services based on the data.

In yet another embodiment, a non-transitory computer-readable medium may include computer-executable instructions configured to cause a processor to send one or more attributes regarding a remote terminal unit (RTU) that controls one or more operations a well device associated with a hydrocarbon well to a cloud-based computing system. The processor may then send model data comprising one or more instructions regarding cloud services to be performed by the cloud-based computing system based on data provided to the cloud-based computing system from the RTU. The processor may then send a request to perform one or more control actions for the operations of the well device to the cloud-based computing system, control the operations of the well device based on the control actions when an approval of the request is received from the cloud-based computing system, and send the data to the cloud-based computing system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed towards improved systems and methods for providing improved systems and methods for configuring, commissioning, operating, maintaining, and managing well devices at a hydrocarbon well site. Moreover, embodiments of the present disclosure are related to leveraging a cloud-based computing network to perform various operations at a hydrocarbon well site more efficiently.

Generally, when initializing a component, such as a remote terminal unit (RTU), at a hydrocarbon well site, a user may configure the RTU such that the RTU operates according to a desired function. However, the user may not be familiar with various ways in which the RTU may be configured to operate. For instance, the operation of the RTU may be dependent on a type of hydrocarbon well that the component may be associated with, a type of well devices that the RTU may be controlling, and the like. Moreover, the user may not be aware of certain functionalities or operations capable of by the RTU. For instance, the RTU may provide data to another computing device, such as a cloud-based computing system, which may perform certain types of analysis and generate various visualizations based on the provided data. However, since the number of different types of RTUs and types of assets that may be monitored can be numerous, it is difficult for a user to know how to configure each different type of asset, much less to know all of the functionalities capable by each respective RTY.

As such, in certain embodiments, the RTU may include model data that may include information related to a type of asset being monitored, types of cloud services sought, location information regarding the RTU, and the like. The model data may be stored within the memory or storage of the RTU. In one embodiment, the model data may be stored within the RTU during manufacturing. By including the model data within the RTU, the RTU may provide details regarding its functionalities and preferred operations to be performed by connected devices to other devices, without waiting for other devices to configure the RTUs settings. As such, each newly commissioned RTU may operate independently to allow users to commission new RTUs without maintaining a knowledge base of a number of different types of RTUs.

In certain embodiments, after the RTU begins its operations, the RTU may send acquired data to the cloud-based computing system based on information provided in the model data. That is, the model data may specify certain operations or services to be provided by the cloud-based computing system. Upon receiving the data acquired by the RTU and the model data, the cloud-based computing system may analyze the data acquired by the RTU at the hydrocarbon well site and provide recommendations concerning how to control the operations of well devices at the well site based on the analysis. By leveraging the computing power of the cloud-based computing system, the RTU may be equipped to improve the production of the hydrocarbon well more quickly, as compared to using the computing power of a single RTU. In certain embodiments, the cloud-based computing system may analyze the collected data from the hydrocarbon well site with respect to data associated with a number of other hydrocarbon well sites. As such, using all of the data acquired at the hydrocarbon well sites, the cloud-based computing system may generate analysis that may predict the production of the hydrocarbon well site based on the production properties for each well at the other hydrocarbon well sites.

Keeping the foregoing in mind, in certain embodiments, the cloud-based computing system may monitor various properties associated with a respective well at the hydrocarbon well site, analyze the monitored properties, and provide certain data analysis and/or visualizations (e.g., plots) to the RTU or to a computing device (e.g., mobile phone) that may assist a well operator to control various operating parameters of the respective well. As a result, the user may receive real time or near real time analysis of data associated with the respective well at the hydrocarbon well site. In addition, the cloud-based computing system may send commands to the RTU to automatically adjust certain operating parameters of the respective well based on the data analysis. In this manner, the operating parameters of the respective well may be modified in real time or near real time to ensure that the hydrocarbons at the respective well are being efficiently produced. Additional details regarding the above mentioned embodiments, as well as details regarding additional embodiments for improving the operations of well devices at the hydrocarbon well site, will be discussed in detail below with reference to FIGS. 1-8.

Cloud-Based Computing System

Figure 1:
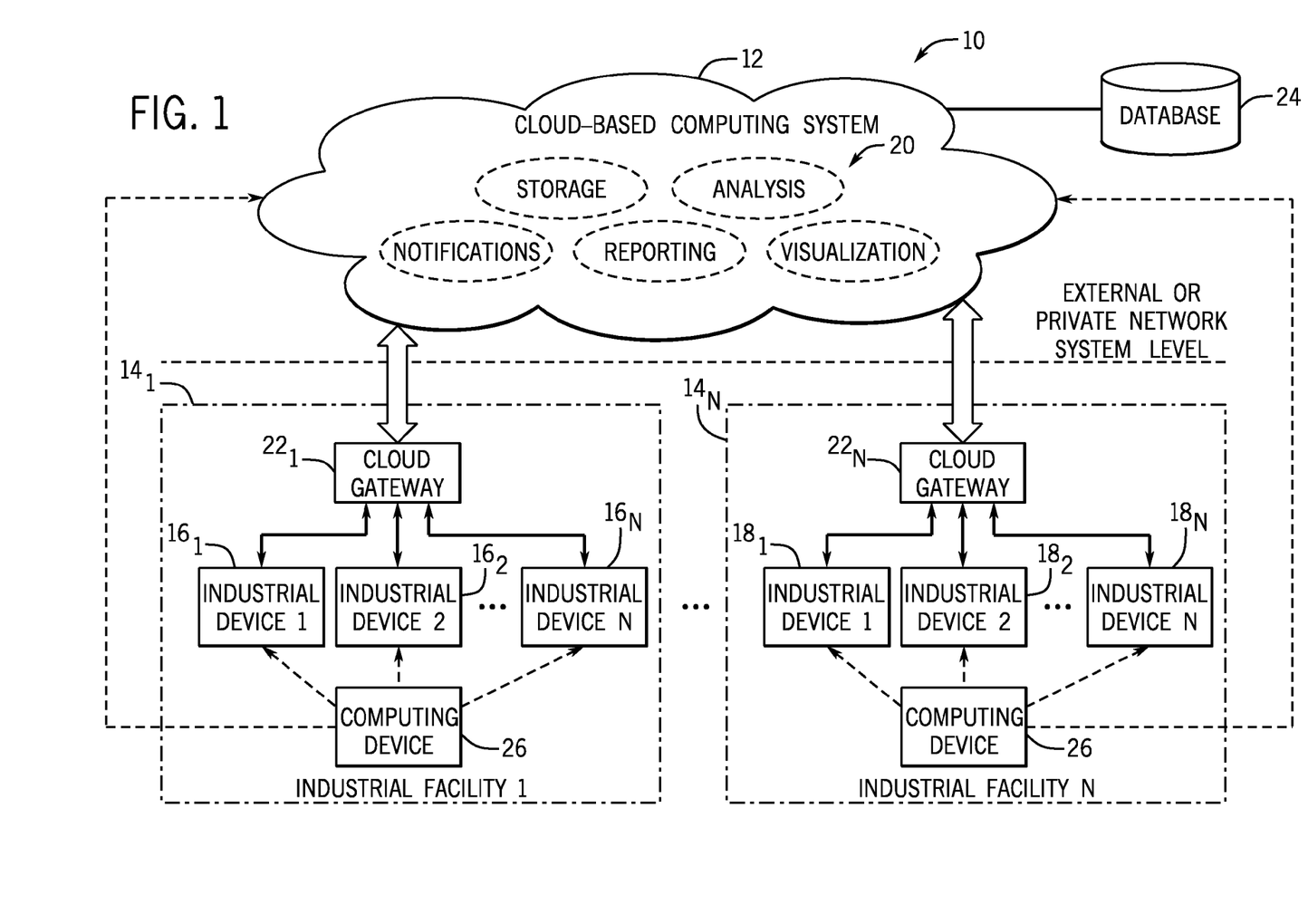
FIG. 1 illustrates a block diagram of a high-level overview of an industrial enterprise that leverages a cloud-based computing system, in accordance with embodiments presented herein.

FIG. 1 illustrates a high-level overview of an industrial enterprise 10 that leverages a cloud-based computing system. The enterprise 10 may include one or more industrial facilities 14, each having a number of industrial devices 16 and 18 (e.g., assets) in use. The industrial devices 16 and 18 may make up one or more automation systems operating within the respective facilities 14. Exemplary automation systems may include, but are not limited to, batch control systems (e.g., mixing systems), continuous control systems (e.g., proportional-integral-derivative (PID) control systems), or discrete control systems. Industrial devices 16 and 18 may also include devices, such as industrial controllers (e.g., programmable logic controllers or other types of programmable automation controllers), field devices such as sensors and meters, motor drives, operator interfaces (e.g., human-machine interfaces, industrial monitors, graphic terminals, message displays, etc.), industrial robots, barcode markers and readers, vision system devices (e.g., vision cameras), smart welders, or other such industrial devices.

In certain embodiments, the industrial devices 16 and 18 may communicatively couple to a computing device 26. The communication link between the industrial devices 16 and 18 and the computing device 26 may be a wired or a wireless connection, such as Wi-Fi®, Bluetooth®, and the like. Generally, the computing device 26 may be any type of processing device that may include communication abilities, processing abilities, and the like. For example, the computing device 26 may be a controller, such as a programmable logic controller (PLC), a programmable automation controller (PAC), or any other controller that may monitor, control, and operate the industrial device 16 and 18. The computing device 26 may be incorporated into any physical device (e.g., the industrial device 16 and 18) or may be implemented as a stand-alone computing device (e.g., general purpose computer), such as a desktop computer, a laptop computer, a tablet computer, a mobile computing device, or the like.

In addition to communicating with the industrial devices 16 and 18, the computing device 26 may also establish a communication link with the cloud-based computing system 12. As such, the computing system 26 may have access to a number of cloud-based services provided by the cloud-based computing system 12, as will be described in more detail below. Generally, the computing device 26 may send and receive data to and from the cloud-based computing system 12 to assist a user of the industrial device 16 or 18 in the commissioning, operation, and maintenance of the industrial automation systems.

Exemplary automation systems can include one or more industrial controllers that facilitate monitoring and control of their respective processes. The controllers may exchange data with the field devices using native hardwired I/O or via a plant network such as Ethernet/IP, Data Highway Plus, ControlNet, DeviceNet, or the like. A given controller may receive any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller may then output appropriate digital and/or analog control signaling to the field devices in accordance with the decisions made by the control program. These outputs may include device actuation signals, temperature or position control signals, operational commands to a machining or material handling robot, mixer control signals, motion control signals, and the like. The control program may include any suitable type of code used to process input signals read into the controller and to control output signals generated by the controller, including but not limited to ladder logic, sequential function charts, function block diagrams, structured text, or other such platforms.

Although the industrial enterprise 10 illustrated in FIG. 1 depicts the industrial devices 16 and 18 as residing in fixed-location industrial facilities 14, the industrial devices 16 and 18 may also be part of a mobile control application, such as a system contained in a truck or other service vehicle. Additionally, although the industrial enterprise 10 of FIG. 1 is described with respect to automation systems, it should be noted that the industrial enterprise 10 described herein may be applied to other industrial environments, such as hydrocarbon production well sites, as will be detailed below.

In certain embodiments, the industrial devices 16 and 18 may be communicatively coupled to the cloud-based computing system 12 that may provide various applications, analysis operations, and access to data that may be unavailable to the industrial devices 16 and 18. That is, the industrial device 16 and 18 may interact with the cloud-based computing system 12, such that the industrial device 16 and 18 may use various cloud-based services 20 to perform its respective operations more efficiently or effectively. The cloud-based computing system 12 may be any infrastructure that enables the cloud-based services 20 to be accessed and utilized by cloud-capable devices. In one embodiment, the cloud-based computing system 12 may include a number of computers that may be connected through a real-time communication network, such as the Internet, Ethernet/IP, ControlNet, or the like. By employing a number of computers, the cloud-based computing system 12 may distribute large-scale analysis operations over the number of computers that make up the cloud-based computing system 12.

Generally, the computers or computing devices provided by the cloud-based computing system 12 may be dedicated to performing various types of complex and time-consuming analysis that may include analyzing a large amount of data. As a result, the industrial device 16 or 18 may continue its respective processing operations without performing additional processing or analysis operations that may involve analyzing large amounts of data collected from other data sources.

In certain embodiments, the cloud-based computing system 12 may be a public cloud accessible via the Internet by devices having Internet connectivity and appropriate authorizations to utilize the cloud-based services 20. In some scenarios, the cloud-based computing system 12 may be a platform-as-a-service (PaaS), and the cloud-based services 20 may reside and execute on the cloud-based computing system 12.

In certain instances, access to cloud-based computing system 12 may be provided to users as a subscription service by an owner of the respective cloud-based services 20. Alternatively, the cloud-based computing system 12 may be a private network of computers operated internally by the enterprise 10. For example, the cloud-based computing system 12 may involve a set of servers hosting the cloud-based services 20 and residing on an internal network protected by a firewall.

The cloud-based services 20 may include, but are not limited to, data storage, data analysis, control applications (e.g., applications that can generate and deliver control instructions to industrial devices 16 and 18 based on analysis of near real-time system data or other factors), visualization applications such as the cloud-based operator interface system, reporting applications, Enterprise Resource Planning (ERP) applications, notification services, or other such applications. If the cloud-based computing system 12 is a web-based system, industrial devices 16 and 18 at the respective industrial facilities 14 may interact with cloud-based services 20 directly or via the Internet. Alternatively or additionally, the industrial devices 16 and 18 may access the cloud-based computing system 12 through separate cloud gateways 22 at the respective industrial facilities 14. Here, the industrial devices 16 and 18 may connect to the cloud gateways 22 via a wired or wireless communication link. In one embodiment, the industrial devices 16 and 18 may access the cloud-based computing system 12 directly using an integrated cloud interface.

In certain embodiments, the cloud-based computing system 12 may also be communicatively coupled to a database 24 that may store data related to the industrial device 16 and 18, data acquired by the industrial device 16 and 18, historical data associated with the industrial facility 14, and the like. The cloud-based computing system 12 may use the data stored within the database 24 to perform various types of data analyses, as will be discussed in greater detail below.

By providing the industrial devices 16 and 18 with access to the cloud-based computing system 12, the industrial enterprise 10 may leverage the computing power of the cloud-based computing system 12 to analyze data acquired from a number of industrial devices 16 and 18, perform more comprehensive data analyses more efficiently, and provide the user of the industrial devices 16 and 18 access to additional information and operational support to more efficiently manage the operations of the industrial enterprise 10. For instance, the cloud-based computing system 12 may provide cloud-based storage that may be scaled to accommodate large quantities of data generated and acquired by the various devices in the industrial enterprise 10. Moreover, multiple industrial facilities 14 at different geographical locations may migrate their respective data to the cloud-based computing system 12 for aggregation, collation, collective analysis, and enterprise-level reporting without establishing a private network between the facilities. In certain embodiments, the industrial devices 16 and 18 may include a configuration capability to automatically detect and communicate with the cloud-based computing system 12 upon installation at any facility, simplifying integration with the cloud-based computing system 12. In another embodiment, the cloud-based computing system 12 may include diagnostic applications that may monitor the health of respective automation systems or their associated industrial devices across an entire plant, or across multiple industrial facilities that make up the enterprise 10. Additionally, the cloud-based computing system 12 may include cloud-based lot control applications that may track a unit of product through its stages of production and collect production data for each unit as it passes through each stage (e.g., barcode identifier, production statistics for each stage of production, quality test data, abnormal flags, etc.). It should be noted that these industrial cloud-computing applications are provided as examples, and the systems and methods described herein are not limited to these particular applications.

Figure 2:
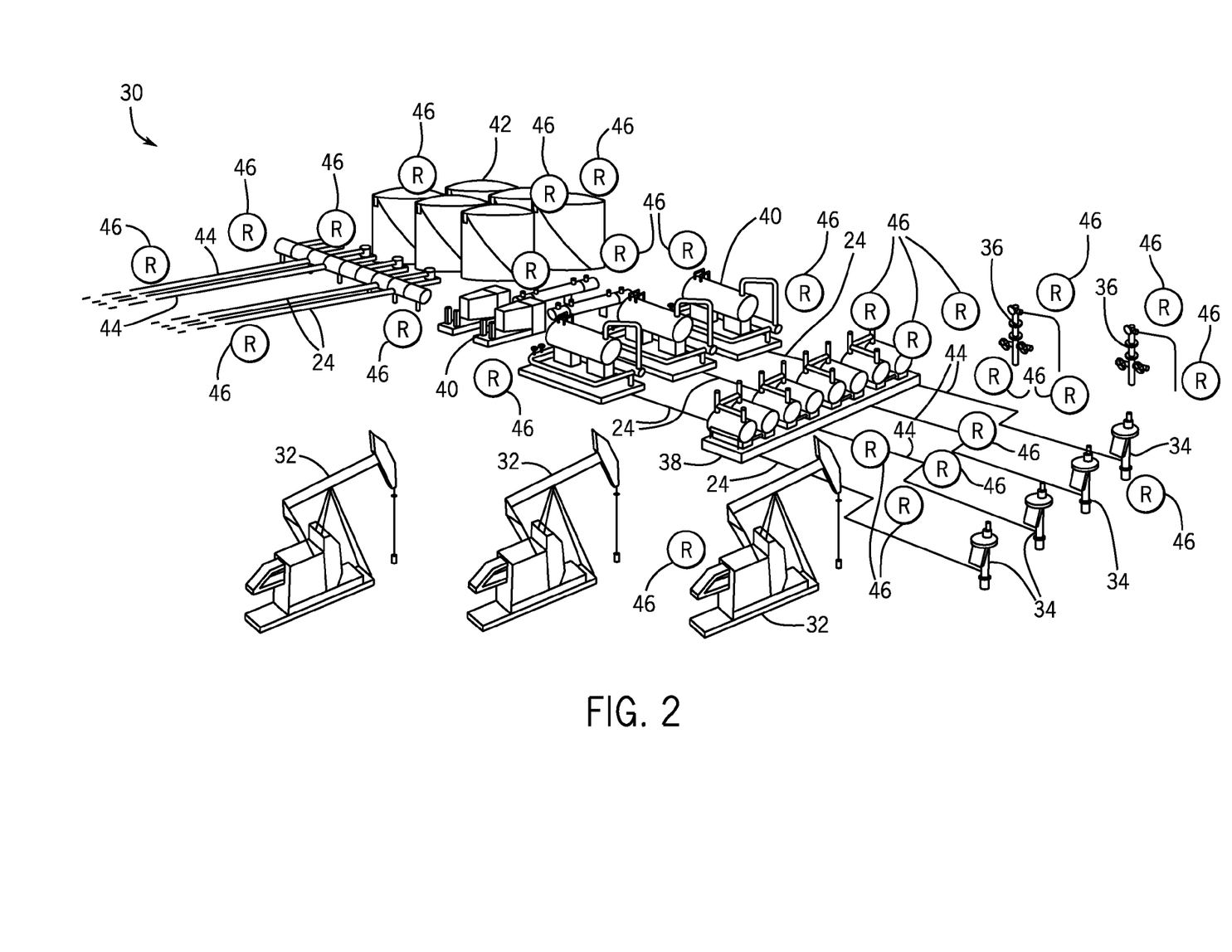
FIG. 2 illustrates a schematic diagram of an example hydrocarbon site that may produce and process hydrocarbons, in accordance with embodiments presented herein.

FIG. 2 illustrates a schematic diagram of an example hydrocarbon site 30 that may employ the cloud-based computing system 12 to assist in the commission, operation, and maintenance of various well devices at the hydrocarbon site 30. As mentioned above, the cloud-based computing system 12 may also be implemented in other industrial environments, such as the hydrocarbon site 30 and the like.

Referring now to FIG. 2, the hydrocarbon site 30 may be an area in which hydrocarbons, such as crude oil and natural gas, may be extracted from the ground, processed, and stored. As such, the hydrocarbon site 30 may include a number of wells and a number of well devices that may control the flow of hydrocarbons being extracted from the wells. In one embodiment, the well devices (e.g., industrial devices 16 or 18, assets, etc.) at the hydrocarbon site 30 may include any device equipped to monitor and/or control production of hydrocarbons at a well site. As such, the well devices may include pumpjacks 32, submersible pumps 34, well trees 36, and the like. After the hydrocarbons are extracted from the surface via the well devices, the extracted hydrocarbons may be distributed to other devices such as wellhead distribution manifolds 38, separators 40, storage tanks 42, and the like. At the hydrocarbon site 30, the pumpjacks 32, submersible pumps 34, well trees 36, wellhead distribution manifolds 38, separators 40, and storage tanks 42 may be connected together via a network of pipelines 44. As such, hydrocarbons extracted from a reservoir may be transported to various locations at the hydrocarbon site 30 via the network of pipelines 44.

The pumpjack 32 may mechanically lift hydrocarbons (e.g., oil) out of a well when a bottom hole pressure of the well is not sufficient to extract the hydrocarbons to the surface. The submersible pump 34 may be an assembly that may be submerged in a hydrocarbon liquid that may be pumped. As such, the submersible pump 34 may include a hermetically sealed motor, such that liquids may not penetrate the seal into the motor. Further, the hermetically sealed motor may push hydrocarbons from underground areas or the reservoir to the surface.

The well trees 36 or Christmas trees may be an assembly of valves, spools, and fittings used for natural flowing wells. As such, the well trees 36 may be used for an oil well, gas well, water injection well, water disposal well, gas injection well, condensate well, and the like. The wellhead distribution manifolds 38 may collect the hydrocarbons that may have been extracted by the pumpjacks 32, the submersible pumps 34, and the well trees 36, such that the collected hydrocarbons may be routed to various hydrocarbon processing or storage areas in the hydrocarbon site 30.

The separator 40 may include a pressure vessel that may separate well fluids produced from oil and gas wells into separate gas and liquid components. For example, the separator 40 may separate hydrocarbons extracted by the pumpjacks 32, the submersible pumps 34, or the well trees 36 into oil components, gas components, and water components. After the hydrocarbons have been separated, each separated component may be stored in a particular storage tank 42. The hydrocarbons stored in the storage tanks 42 may be transported via the pipelines 44 to transport vehicles, refineries, and the like.

The well devices may also include monitoring systems that may be placed at various locations in the hydrocarbon site 30 to monitor or provide information related to certain aspects of the hydrocarbon site 30. As such, the monitoring system may be a controller, a remote terminal unit (RTU), or any computing device that may include communication abilities, processing abilities, and the like. For discussion purposes, the monitoring system will be embodied as the RTU 46 throughout the present disclosure. However, it should be understood that the RTU 46 may be any component capable of monitoring and/or controlling various components at the hydrocarbon site 30.

The RTU 46 may include sensors or may be coupled to various sensors that may monitor various properties associated with a component at the hydrocarbon site 30. The RTU 46 may then analyze the various properties associated with the component and may control various operational parameters of the component. For example, the RTU 46 may measure a pressure or a differential pressure of a well or a component (e.g., storage tank 42) in the hydrocarbon site 30. The RTU 46 may also measure a temperature of contents stored inside a component in the hydrocarbon site 30, an amount of hydrocarbons being processed or extracted by components in the hydrocarbon site 30, and the like. The RTU 46 may also measure a level or amount of hydrocarbons stored in a component, such as the storage tank 42. In certain embodiments, the RTU 46 may be iSens-GP Pressure Transmitter, iSens-DP Differential Pressure Transmitter, iSens-MV Multivariable Transmitter, iSens-T2 Temperature Transmitter, iSens-L Level Transmitter, or Isens-IO Flexible I/O Transmitter manufactured by Rockwell Automation®.

In one embodiment, the RTU 46 may include a sensor that may measure pressure, temperature, fill level, flow rates, and the like. The RTU 46 may also include a transmitter, such as a radio wave transmitter, that may transmit data acquired by the sensor via an antenna or the like. The sensor in the RTU 46 may be wireless sensors that may be capable of receive and sending data signals between RTUs 26. To power the sensors and the transmitters, the RTU 46 may include a battery or may be coupled to a continuous power supply. Since the RTU 46 may be installed in harsh outdoor and/or explosion-hazardous environments, the RTU 46 may be enclosed in an explosion-proof container that may meet certain standards established by the National Electrical Manufacturer Association (NEMA) and the like, such as a NEMA 4× container, a NEMA 7× container, and the like.

The RTU 46 may transmit data acquired by the sensor or data processed by a processor to other monitoring systems, a router device, a supervisory control and data acquisition (SCADA) device, or the like. As such, the RTU 46 may enable users to monitor various properties of various components in the hydrocarbon site 30 without being physically located near the corresponding components.

In operation, the RTU 46 may receive real-time or near real-time data associated with a well device. The data may include, for example, tubing head pressure, tubing head temperature, case head pressure, flowline pressure, wellhead pressure, wellhead temperature, and the like. In any case, the RTU 46 may analyze the real-time data with respect to static data that may be stored in a memory of the RTU 46. The static data may include a well depth, a tubing length, a tubing size, a choke size, a reservoir pressure, a bottom hole temperature, well test data, fluid properties of the hydrocarbons being extracted, and the like. The RTU 46 may also analyze the real-time data with respect to other data acquired by various types of instruments (e.g., water cut meter, multiphase meter) to determine an inflow performance relationship (IPR) curve, a desired operating point for the wellhead 30, key performance indicators (KPIs) associated with the wellhead 30, wellhead performance summary reports, and the like. Although the RTU 46 may be capable of performing the above-referenced analyses, the RTU 46 may not be capable of performing the analyses in a timely manner. Moreover, by just relying on the processor capabilities of the RTU 46, the RTU 46 is limited in the amount and types of analyses that it may perform. Moreover, since the RTU 46 may be limited in size, the data storage abilities may also be limited.

Keeping the foregoing in mind, in certain embodiments, the RTU 46 may establish a communication link with the cloud-based computing system 12 described above. As such, the cloud-based computing system 12 may use its larger processing capabilities to analyze data acquired by multiple RTUs 26. Moreover, the cloud-based computing system 12 may access historical data associated with the respective RTU 46, data associated with well devices associated with the respective RTU 46, data associated with the hydrocarbon site 30 associated with the respective RTU 46 and the like to further analyze the data acquired by the RTU 46.

Figure 3:
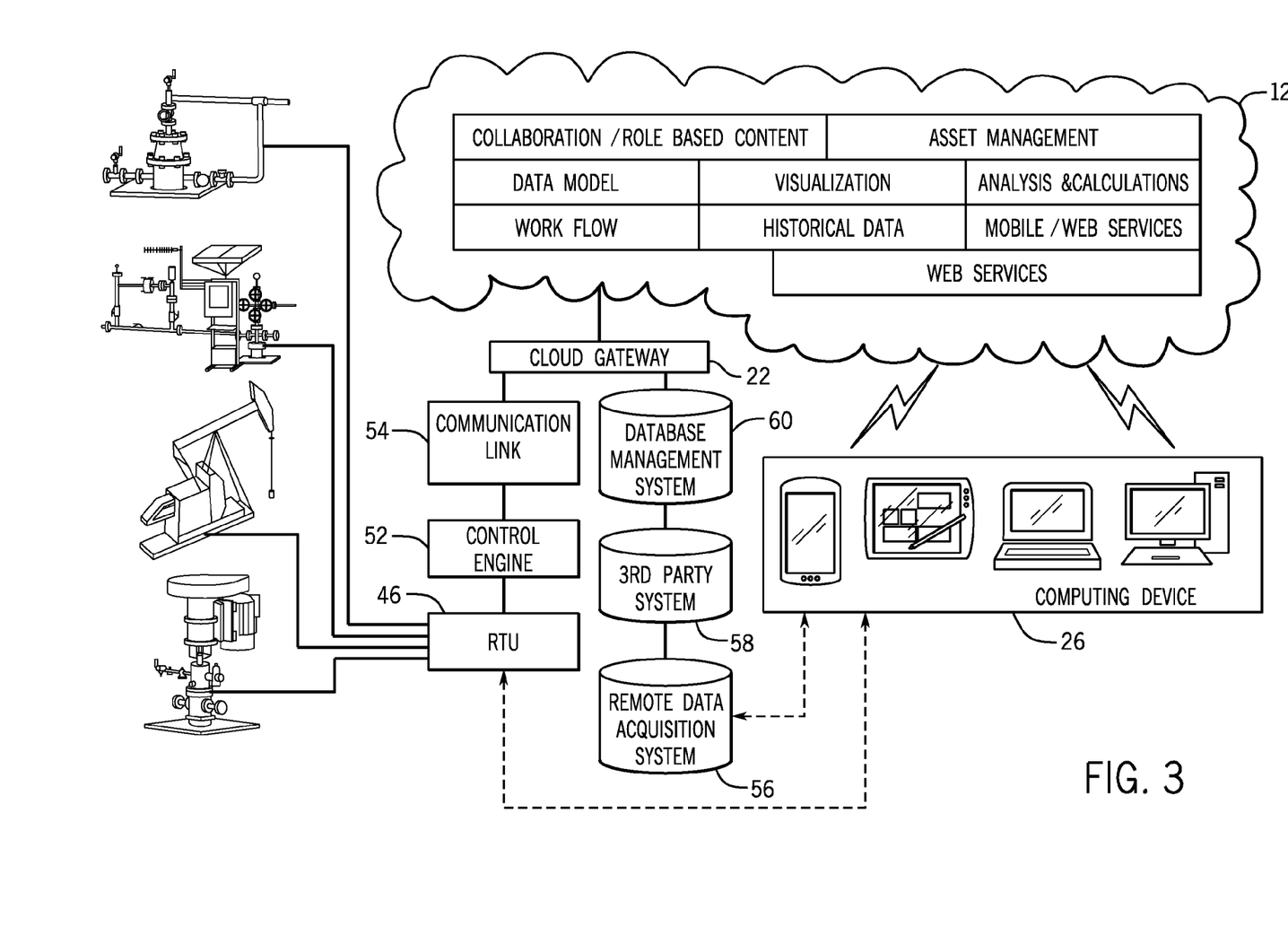
FIG. 3 illustrates an example overview of a cloud-based communication architecture for the example hydrocarbon site of FIG. 2, in accordance with embodiments presented herein.

Accordingly, in one embodiment, the RTU 46 may communicatively couple to the cloud-based computing system 26 via a cloud-based communication architecture as shown in FIG. 3. Referring to FIG. 3, the RTU 46 may communicatively couple to a control engine 52 such as ControlLogix® or the like. The control engine 52 may, in turn, communicatively couple to a communication link 54 that may provide a protocol or specifications such as OPC Data Access that may enable the control engine 52 and the RTU 46 to continuously communicate its data to the cloud-based computing system 12. The communication link 54 may be communicatively coupled to the cloud gateway 22, which may then provide the control engine 52 and the RTU 46 access to communicate with the cloud-based computing system 12. Although the RTU 46 is described as communicating with the cloud-based computing system 12 via the control engine 52 and the communication link 54, it should be noted that in some embodiments, the RTU 46 may communicate directly with the cloud gateway 22 like the industrial device 16 and 18 of FIG. 1 or may communicate directly with the cloud-based computing device 12.

In some embodiments, the RTU 46 may communicatively couple to the control engine 52 or the communication link 54 via an Ethernet IP/Modbus network. As such, a polling engine may connect to the RTU 46 via the Ethernet IP/Modbus network to poll the data acquired by the RTU 46. The polling engine may then use an Ethernet network to connect to the cloud-based computing system 12.

As mentioned above, the RTU 46 may monitor and control various types of well devices and may send the data acquired by the respective well devices to the cloud-based computing system 12 according to the architecture described above. For example, as shown in FIG. 3, the RTU 46 may monitor and control an electrical submersible pump (ESP), a gas lift (GL), a rod pump controller (RPC), a progressive cavity pump (PCP), and the like. In the ESP, the RTU 46 may sense and control the wellhead and other operating variables of the ESP system. In the GL, the RTU 46 may adjust a gas lift injection flow to operator flow rate, compute real-time estimated gas-oil-water production, and the like. In the RPC, the RTU 46 may provide advance rod pump controlling operations for beam pump applications and the like. The RTU 46 may also monitor both polish rod load and continuous walking beam position to develop dynamometer cards. In the PCP, the RTU 46 may provide local and remote monitoring of the wellhead and other PCP variable. Here, the RTU 46 may also perform basic analysis and adjust the pumping conditions of the PCP based on the received data from the PCP.

In addition to the RTU 46 and the control engine 52 being able to communicate with the cloud-based computing system 12, remote data acquisition systems 56, third party systems 58, and database management systems 60 may also communicatively couple to the cloud gateway 22. The remote data acquisition systems 56 may acquire real-time data transmitted by various data sources such as the RTU 46 and other third party systems 58. The database management system 60 may be a relational database management system that stores and retrieves data as requested by various software applications. By way of example, the database management system 60 may be a SQL server, an ORACLE server, a SAP server, or the like.

As mentioned above, the computing device 26 may communicatively couple to the RTU 46 and the cloud-based computing system 12. As shown in FIG. 3, the computing device 26 may include a mobile device, a tablet device, a laptop, a general-purpose computer, or the like. In certain embodiments, the computing device 26 may also communicatively couple with the remote data acquisition systems 56, the third party system 58, and the database management system 60. By communicating with all of these types of devices, the computing device 26 may receive data and generate visualizations associated with each respective device, thereby providing the user of the computing device 26 a more efficient manner in which to view and analyze the data. Moreover, since the computing device 26 may receive data from the cloud-based computing system 12, the computing device 26 may receive visualizations and data related to various types of analyses and cloud services 20 provided by the cloud-based computing system 12.

In some embodiments, the cloud-based computing system 12 may include applications related to collaboration or role based content, asset management, data models, visualizations, analysis & calculations, workflows, historical data, mobile web services, web services, and the like. The collaboration or role-based application may include facilitating collaboration between various users of the cloud-based computing system 12 to assist in the commission, operation, or maintenance of well devices at the hydrocarbon site 30. The asset management application may track the hardware and software maintenance of the well devices and the software used therein. The data model application may include algorithms that may simulate various types of data related to the production of hydrocarbons by a well device, the production of hydrocarbons at a hydrocarbon site, and the like based on various process parameter inputs received by the cloud-based computing system 12. The visualization application may generate various types of visualizations such as graphs, tables, data dashboards, and the like based on the data received by the cloud-based computing system 12 and the data available to the cloud-based computing system 12 via the database 24 or the like.

The analysis & calculations applications may include software applications that may provide additional information regarding the data received by the cloud-based computing system 12. For example, the analysis & calculations applications may analyze flow rate data regarding the production of hydrocarbons by a particular well site to determine the amount of hydrocarbons, water, and sand (i.e., multiphase measurements) contained in the produced hydrocarbons.

The workflow applications may be software applications that generate workflows or instructions for users of the well device or personnel at the hydrocarbon site 30 may use to perform their respective tasks. In one example, the cloud-based computing system 12 may generate a workflow regarding the commissioning of a well device, troubleshooting an operation issue with a well device, or the like.

In certain embodiments, the workflow applications may determine the workflows based on historical data stored within the cloud-based computing system 12. That is, the historical data may include data related to previous items produced by any application within the cloud-based computing system 12 such as workflows, data analyses, reports, visualizations, and the like. Moreover, the historical data may also include raw data acquired by the RTU 46 or any other device and received by the cloud-based computing system 12. As such, the cloud-based computing system 12 may use the historical data to perform additional analyses on the received data, simulate or predict how the operations of a well device may change, simulate how the production of hydrocarbons at a well site may change, and the like.

The cloud-based computing system 12 may also provide mobile web services and web services that may enable the computing device 26, or any other device communicatively coupled to the cloud-based computing system 12, to access the Internet, Intranet, or any other network that may be available. Moreover, the cloud-based computing system 12 may use the web services to access information related to various analyses that it may be performing and the like.

Figure 4:
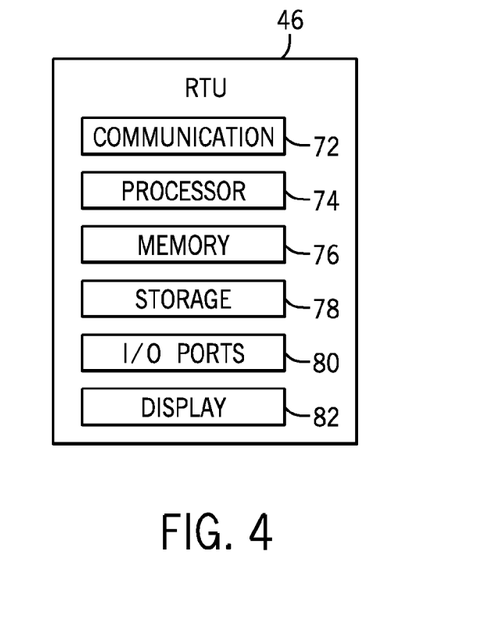
FIG. 4 illustrates a block diagram of a remote terminal unit (RTU) that may be employed in the cloud-based communication architecture of FIG. 3, in accordance with embodiments presented herein.

Referring back to the RTU 46, FIG. 4 illustrates a block diagram of various components that may be part of the RTU 46 and may be used by the RTU 46 to perform various analysis operations. As shown in FIG. 4, the RTU 46 may be any suitable processor-based device that includes a communication component 72, a processor 74, a memory 76, a storage 78, input/output (I/O) ports 80, a display 82, and the like. The communication component 72 may be a wireless or wired communication component that may facilitate communication between different RTUs 46, gateway communication devices, various control systems, and the like. The processor 74 may be any type of computer processor or microprocessor capable of executing computer-executable code. The memory 76 and the storage 78 may be any suitable articles of manufacture that can serve as media to store processor-executable code, data, or the like. These articles of manufacture may represent computer-readable media (i.e., any suitable form of memory or storage) that may store the processor-executable code used by the processor 74 to perform the presently disclosed techniques. The memory 76 and the storage 78 may also be used to store data received via the I/O ports 80, data analyzed by the processor 74, or the like.

The I/O ports 80 may be interfaces that may couple to various types of I/O modules such as sensors, programmable logic controllers (PLC), and other types of equipment. For example, the I/O ports 80 may serve as an interface to pressure sensors, flow sensors, temperature sensors, and the like. As such, the RTU 46 may receive data associated with a well via the I/O ports 80. The I/O ports 80 may also serve as an interface to enable the RTU 46 to connect and communicate with surface instrumentation, flow meters, water cut meters, multiphase meters, and the like.

In addition to receiving data via the I/O ports 80, the RTU 46 may control various devices via the I/O ports 80. For example, the RTU 46 may be communicatively coupled to an actuator or motor that may modify the size of a choke that may be part of the well. The choke may control a fluid flow rate of the hydrocarbons being extracted at the well or a downstream system pressure within the network of pipelines 44 or the like. In one embodiment, the choke may be an adjustable choke that may receive commands from the RTU 46 to change the fluid flow and pressure parameters at the well.

The display 82 may include any type of electronic display such as a liquid crystal display, a light-emitting-diode display, and the like. As such, data acquired via the I/O ports and/or data analyzed by the processor 74 may be presented on the display 82, such that operators having access to the RTU 46 may view the acquired data or analyzed data at the hydrocarbon well site. In certain embodiments, the display 82 may be a touch screen display or any other type of display capable of receiving inputs from the operator.

Figure 5:
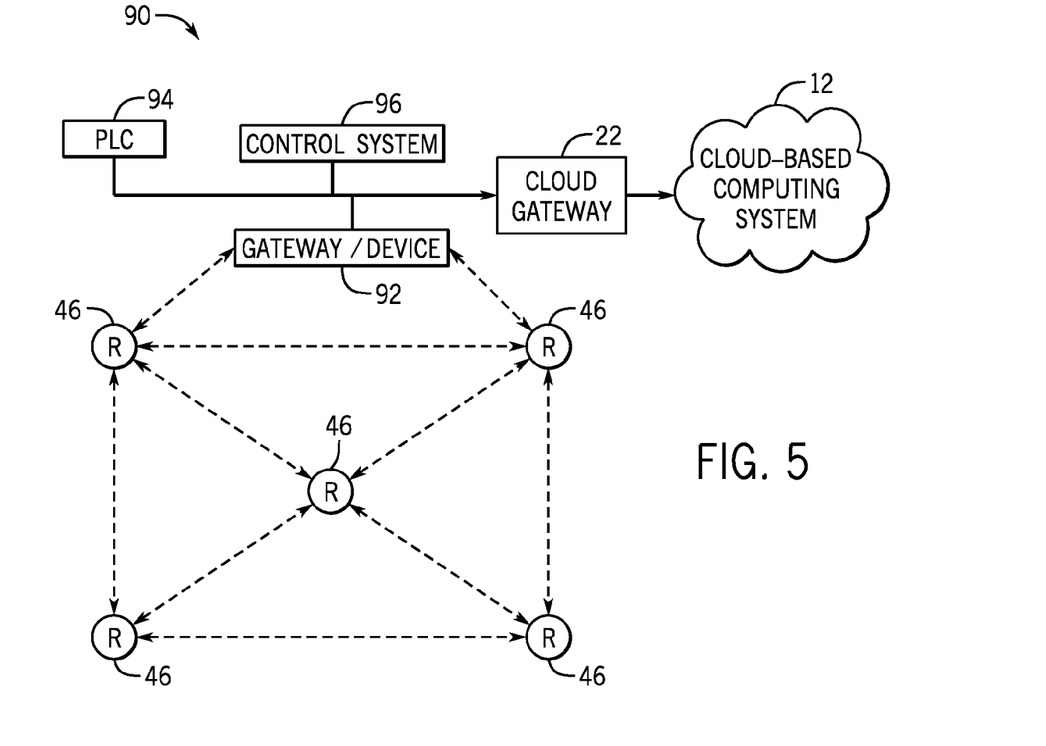
FIG. 5 illustrates a communication network that may be employed in the hydrocarbon site of FIG. 2, in accordance with embodiments presented herein.

FIG. 5 illustrates an example communication network 90 that may be employed in the hydrocarbon site 30. As shown in FIG. 5, each RTU 46 may be communicating with one or more other RTUs 46. Referring back to the communication component 72, the RTU 46 may use the communication component 72 to communicatively couple to various devices in the hydrocarbon site 30 and to the cloud-based computing system 12. That is, each RTU 46 may communicate with certain RTUs 46 that may be located within some range of the respective RTU 46. Each RTU 46 may communicate with each other via its respective communication component 72. As such, each RTU 46 may transfer raw data acquired at its respective location, analyzed data associated with a respective well, or the like to each other. In one embodiment, the RTUs 46 may route the data to a gateway device 92. The gateway device 92 may be a network device that may communicate with other networks or devices that may use different communication protocols. As such, the gateway device 92 may include similar components as the RTU 46. However, since the gateway device 92 may not be located at the well site or coupled to a well device, the gateway device 92 may have a larger form factor as compared to the RTU 46. Additionally, since the gateway device 92 may receive and process data acquired from multiple RTUs 46, the gateway device 92 may use a larger battery or power source as compared to the RTU 46 to process the additional data. In this manner, the gateway device 92 may also include a larger and/or faster processor 74, a larger memory 76, and a larger storage 78, as compared to the RTU 46.

After receiving data from the RTUs 46, the gateway device 72 may provide the data from each RTU 46 to various types of devices, such as a programmable logic controller (PLC) 94, a control system 96, and the like. The PLC 94 may include a digital computer that may control various components or machines in the hydrocarbon site 30. The control system 96 may include a computer-controlled system that monitors the data received via the RTUs 46 and may and control various components in the hydrocarbon site 30 and various processes performed on the extracted hydrocarbons by the components. For example, the control system 96 may be a supervisory control and data acquisition (SCADA), which may control large-scale processes, such as industrial, infrastructure, and facility-based processes, that may include multiple hydrocarbon sites 30 separated by large distances.

The gateway device 92 may also be coupled to the cloud gateway 22 mentioned above. As such, the gateway device 92 may also provide the RTUs 46 access to communicate with the cloud-based computing system 12 via the cloud gateway 22.

Although FIGS. 3 and 4 illustrate how the RTU 46 may communicatively couple to the cloud-based computing system 12, it should be noted that the RTU 46 may also operate in an environment that does not have access to the cloud-based computing system 12. That is, in some embodiments, the RTU 46 may operate in an environment that may have a data processing facility located within a particular range of the RTU 46 or within a range of a communication network accessible by the RTU 46 or the gateway device 92. As such, the data processing facility may provide similar services as described above with respect to the cloud-based computing system 12. For example, the data processing facility may be provide applications and services manufactured by Rockwell Automation® such as FactoryTalk AssetCenter, FactoryTalk VantagePoint, FactoryTalk View SE, FactoryTalk Historian, VantagePoint Connectors, FactoryTalk Live Data, FactoryTalk VantagePoint JSON Web Services, as well as the services provided by the cloud-based computing system 12.

In certain embodiments, each RTU 46 may acquire data from various sensors disposed throughout a respective well, the hydrocarbon well site 30, and the like. To enable well site personnel (i.e., operators physically located at the well site) to determine that the well is operating efficiently, the RTU 46 may perform some initial data analysis using the processor 74 and may output the results of the data analysis via the display 82. In certain embodiments, the monitoring device 26 may transmit the results of the data analysis to the computing device 26, which may be a handheld electronic device (e.g., mobile phone, tablet computer, laptop computer, etc.) via the communication component 72 using a communication protocol, such as Bluetooth® or any other wireless or wired protocol. After receiving the results of the data analysis via the display 82 or the handheld electronic device, the operator may modify various operating parameters of the well based on the results. That is, the operator may interpret the analyzed data and modify the operating parameters of the well to increase the efficiency at which the well may produce hydrocarbons. In one embodiment, the RTU 46 may automatically determine whether the operating parameters of the well are desirable based on the results of the data analysis to achieve a desired efficiency or operating point of the well.

In addition to employing the RTU 46 to analyze data associated with a respective well, a well device, or the hydrocarbon site 30, the RTU 46 may also, as discussed above, receive analyzed data from the cloud-based computing system 12. Moreover, the computing device 26 may also receive the same analyzed data from the cloud-based computing system 12, thereby providing the operator the opportunity to interpret the analyzed data and modify the operating parameters of the well. Moreover, since the cloud-based computing system 12 may have access to additional data sources and may have more processing power as compared to the RTU 46, the operator may have access to more accurate analysis to further increase the efficiency of the operations of the well, the well device, the hydrocarbon site 30, and the like.

Although the use of the cloud-based computing system 12 with the RTU 46 may enable improved operations at the hydrocarbon site 30, the improved operations are based on the ability of the RTU 46 to communicatively couple to the cloud-based computing system 12 and the ability of a user of the RTU 46 to configure the RTU 46 correctly. Given the different types of RTUs 46 that may be used at the hydrocarbon site 30, the different types of well devices that may be employed at the hydrocarbon site 30, and different conditions that may be present at the hydrocarbon site 30, it may be difficult for a user to accurately configure the RTU 46 to communicatively couple to the cloud-based computing system 12 and to effectively control the operations of an associated well device.

Self Configuration of RTUs

Figure 6A:
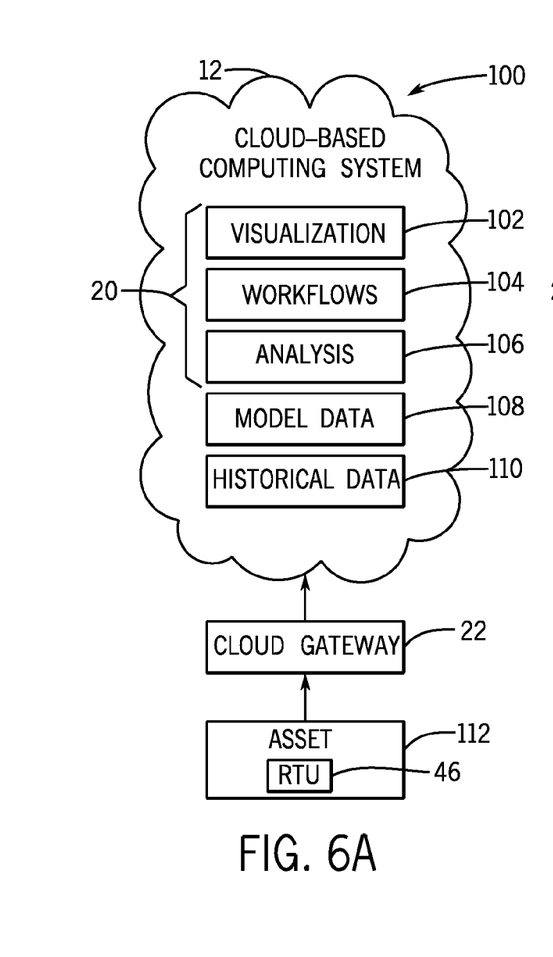
FIG. 6A illustrates a block diagram of components within the communication network of FIG. 5, in accordance with embodiments presented herein.

FIG. 6A illustrates a block diagram 100 of components within the communication network of FIG. 5, in accordance with embodiments presented herein. In one embodiment, the cloud-based computing system 12 may provide a number of cloud-based services 20 such as visualization services 102, workflow services 104, analysis services 106, and the like. Additionally, the cloud-based computing system 12 may store various types of information or data such as model data 108, historical data 110, and the like. The model data 108 may include a definition or specification regarding an asset 112 or a device that may be controlled by a control system, RTU 46, or the like. The asset 112 may refer to any device (e.g., industrial device 16 and 18, pumpjacks 32, submersible pumps 34, well trees 36, etc.) that may be part of the industrial enterprise 10, the hydrocarbon site 30, or the like. As such, the asset 112 may contribute to the operations and functions of the industrial enterprise 10, the hydrocarbon site 30, or the like. The historical data 110 may include information stored regarding various assets 112, outputs provided by the visualization services 102, the workflow services 104, the analysis services 106, and the like.

The model data 108 may specify a type of asset, a version of the asset, capabilities of the asset, and the like. The model data 108 may also include information regarding the data available to the asset and acquired by a monitoring device (e.g., RTU 46) associated with the asset. In addition, the model data 108 may include relevant information related to the monitoring device or RTU 46 being used to control the asset 112.

The model data 108 may also include certain default instructions for the asset 112 or the RTU 46 to perform upon initialization. Additionally, the model data 108 may also include certain instructions regarding how the asset or the RTU 46 may operate if connection to other devices (e.g., cloud-computing system 12) is established.

The model data 108 may also include instructions for certain operations (e.g., cloud services 20) to be performed by the visualization services 102, the workflow services 104, the analysis services 106, and the like. The visualization services 102, the workflow services 104, and the analysis services 106 may correspond to the cloud-based services 20 described above. Although the cloud services 20 depicted in FIGS. 6A, 6B, and 6C include visualization services 102, the workflow services 104, and the analysis services 106, it should be understood that the cloud services 20 may include any suitable cloud service 20, such as those described above with reference to FIG. 1 and FIG. 3.

In one embodiment, these services may be provided by the cloud-based computing system 12, by third party developers, or the like. The visualization services 102 may generally provide a number of options to visualize or generate images that depict data. As such, the model data 108 may specify certain visualizations in which the data received from the RTUs 26 are to be generated.

The workflow services 104 may provide a workflow for users of the asset 112 to use for operating the asset 112. Alternatively, the workflow services 104 may incorporate the RTU 46 for use in a workflow to manage the operation of the industrial enterprise 10, the hydrocarbon site 30, or the like. For example, the model data 108 may specify that the RTU 46 may control a pressure of the network of pipelines 44 in relation to a workflow that manages the production of hydrocarbons at the hydrocarbon site 30. If the workflow services 104 coordinates the production of hydrocarbons at the hydrocarbon site 30 and maintains a certain level of production, the model data 108 may specify that the RTU 24 may be used to control the pressure of the network of pipelines 44 to ensure that the hydrocarbon site 30 maintains the certain level of production.

In the same manner, the analysis services 106 may provide certain analysis regarding the data acquired from the RTU 46 and other data acquired from the industrial enterprise 10, the hydrocarbon site 30, and the like. The analysis services 106 may produce trend charts and perform certain predictive operations to determine how various assets 112 may perform over time. The predictive operations may include simulations regarding the operations and/or productions of the assets 112. The model data 108 may specify that the data acquired from a certain RTU 46 may assist in certain analysis, and thus should be used to perform certain analysis.

The contents or attributes of the model data 108 related to the cloud services 20 may correspond to a set of attributes used for a particular purpose. For instance, the RTU 46 may control a rod pump control (RPC) artificial lift by executing a particular application designed to control the operations of the RPC artificial lift. In this case, the model data 108 may define certain parameters, data sources, and settings for the cloud services 20 to perform when the RTU 46 is being used to control the RPC artificial lift (e.g., when executing RPC application). It should be noted that the RTU 46 may also be used to perform various other tasks associated with controlling other assets 112, collected various types of data, performing different types of analysis, and the like. With regard to performing each different operation, the model data 108 may include a different set of attributes for each different operation that may be performed by the RTU 46. That is, the model data 108 may specify which of the cloud services 20 to perform, the data to use for each cloud service, a format that the outputs are presented for each cloud service, how the outputs are distributed throughout the network for each cloud service, and the like. In some embodiments, the RTU 46 may simultaneously perform different operations and cause different types of cloud services 20 to also be performed simultaneously.

Regarding each set of attributes, in some embodiments, the model data 108 may also include information indicating a version of each set of attributes. The version for a set of attributes may correspond to a particular version of an application being executed by the RTU 46, a particular version of the asset 112 being controlled, or the like. In addition, the model data 108 may also include usage data indicating when each set of attributes are to be used based on the application being executed by the RTU 46, the asset 112 being controlled by the RTY 46, how the RTU 46 is being used, and the like.

In one embodiment, the RTU 46 of the asset 112 may connect to the cloud-based computing system 12 via the cloud gateway 22 and retrieve configuration instructions from the cloud-based computing system 12 based on the model data 108. In this way, the cloud-based computing system 12 may automatically discover the RTUs 26 and configure these discovered devices accordingly.

When commissioning the RTU 46, the cloud-based computing system 12 may prompt the RTU 46 to send data related to the RTU 46, a well device associated with the RTU 46, a collection of well devices associated with the RTU 46, a well site associated with the RTU 24, the hydrocarbon site 30 associated with the RTU 46, and the like. Examples of the data related to the RTU 46 may include an indication of an identity of the RTU 46, a location (e.g., global positioning system (GPS) coordinate) of the RTU 46, a context or relationship of the RTU 46 within the cloud-based communication architecture 20, a vendor associated with the RTU 46, a model number associated with the RTU 46, a serial number associated with the RTU 46, a firmware version associated with the RTU 46, a well device software application associated with the RTU 46, and the like. Data related to the well device may include an indication of a type of the well device (e.g., ESP, GL, RPC, PCP, etc.), a location (e.g., GPS coordinates) associated with the well device, a vendor associated with the well device, a model number associated with the well device, and the like.

The data may also provide details regarding the well site associated with the RTU 24. That is, the data may indicate a location (e.g., GPS coordinates) associated with the well site, a type of well site that is being monitored and/or controlled. For instance, the well site may be a land oil site, a subsea oil site, a gas site, a shale gas site, or the like.

In addition to the data described above, the RTU 24 may also transmit work instructions or work flows containing commissioning instructions for the RTU 24, a well device associated with the RTU 24, or collection of well devices associated with the RTU 24, or the like to the cloud-based computing system 12. As such, the cloud-based computing system 12 may store the commissioning instructions for the RTU 24 or other well devices for distribution to various users in the cloud-based communication network.

Upon receiving various types of information regarding the RTU 24, the cloud-based computing system 12 may send any relevant firmware and/or software updates to the RTU 24. Generally, upon receiving the data from the RTU 24 (block 106), the cloud-based computing system 12 may identify any relevant firmware and/or software updates associated with the RTU 24 that may be available on the database 24, the Internet, the Intranet, or the like.

In addition to updates, the cloud-based computing system 12 may also send well device software application or software applications executable by the RTU 24 and used to control and/or monitor the well device(s) to the RTU 24. After receiving the software application, the RTU 24 may initialize its operation and/or the operation(s) of associated well device(s). The software application may be used to enable the RTU 46 to interface with the well device, various sensors associated with the well device or the well site, and the like. The software application may thus be used to monitor and/or control the well device.

Figure 6B:
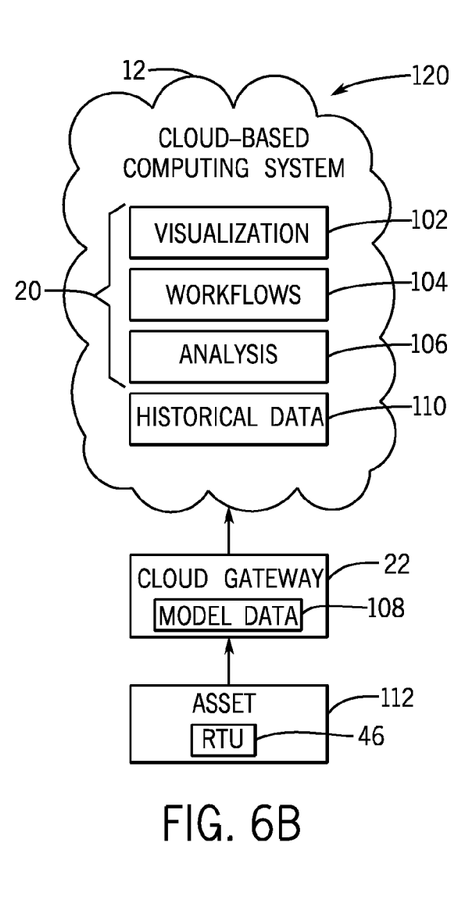
FIG. 6B illustrates a second embodiment of a block diagram detailing components within the communication network of FIG. 5, in accordance with embodiments presented herein.

FIG. 6B illustrates a second embodiment of a block diagram 120 detailing components within the communication network 90 of FIG. 5, in accordance with embodiments presented herein. As shown in the block diagram 120, the model data 108 may also be stored within the cloud gateway 22. As such, the RTU 46 may be able to access the cloud gateway 22 and the cloud gateway 22 may provide the model data 108 along with the data acquired from the RTU 46 to the cloud-based computing system 12.

In both of the embodiments of FIGS. 6A and 6B described above, the cloud-based computing system 12 and the cloud gateway 22 may include model data 108 for a number of different types of assets 112, RTUs 26, and the like. As such, the cloud-based computing system 12 and the cloud gateway 22 may query the model data 108 based on identification information received from the RTU 46 and may begin performing the services mentioned above after identifying the appropriate model data 108 that matches the identification of the RTU 46. In this way, the RTU 46 depends on connectivity to and instructions from the cloud-based computing system 12 or the cloud gateway 22. That is, the RTU 46 may be discovered by the cloud-based computing system 12 or the cloud gateway 22 and the RTU 46 may be configured based on the model data 108 stored therein. In both of these cases, each RTU 46 added to the industrial enterprise 10 or the hydrocarbon site 30 may be individually configured by the cloud-based computing system 12 or the cloud gateway 22 before being commissioned or starting its operation. With this in mind, it may be beneficial to enable the RTU 46 to begin its operations and to be configured without any assistance from other devices. Instead, by configuring itself, the RTU 46 may reduce time and effort of users in enabling the RTU 46 to begin its operation and in maintaining each change that may be implemented for the RTU 46.

Figure 6C:
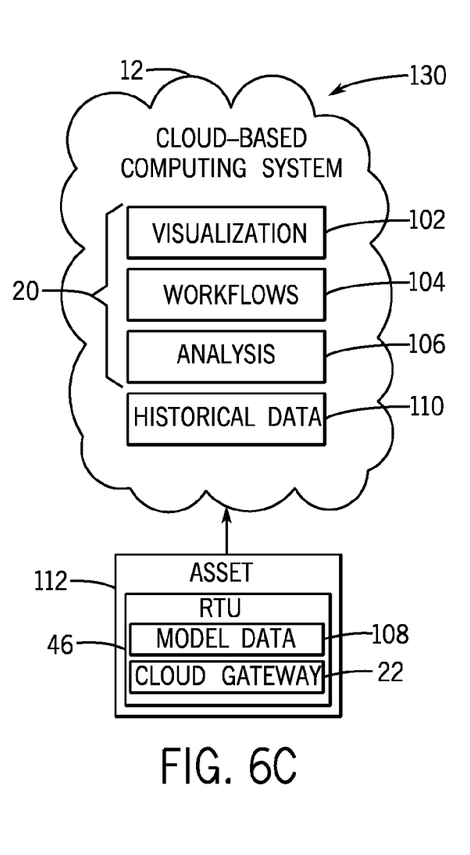
FIG. 6C illustrates a third embodiment of a block diagram detailing components within the communication network of FIG. 5, in accordance with embodiments presented herein.

FIG. 6C illustrates a third embodiment of a block diagram 130 detailing components within the communication network of FIG. 5, in accordance with embodiments presented herein. As shown in FIG. 6C, the RTU 46 may include the model data 108, which may specify the operations of the RTU 46 as well as details regarding cloud services 20 that may be performed using the data acquired by the RTU 46. By embedding the model data 108 into the RTU 46, the RTU 46 may be capable of initializing itself after power up, controlling operations of the asset 112, and the like without waiting for instructions from the cloud-based computing system 12. Moreover, as newer versions of assets 112 or RTUs 26 are deployed with the corresponding model data 108 stored therein, the cloud-based services 20 provided by the cloud-based computing system 12 may be performed using additional features and capabilities available on the newer versions of the assets 112 and the RTUs 26. As such, each asset 112 and RTU 46 does not rely on the cloud-based computing system 12 to begin its operation. Moreover, the asset 112 or RTU 46 may store relevant data for the cloud services 20 until connection to the cloud-based computing system 12 is established.

Although the model data 108 is described as being stored within the RTU 46, it should be noted that the model data 108 may be stored in any suitable device. For example, the model data 108 may be stored in a controller or computing system used to control operations of the industrial devices 16 and 18 of the industrial enterprise 10, the well devices of the hydrocarbon site 30, or the like. In any case, by storing the model data 108 within the respective device, the respective device may be capable of configuring itself automatically to begin certain operations without waiting for commissioning steps to be performed by another computing system or user, thereby decreasing the burden of commissioning and operating the respective devices.

Figure 7:
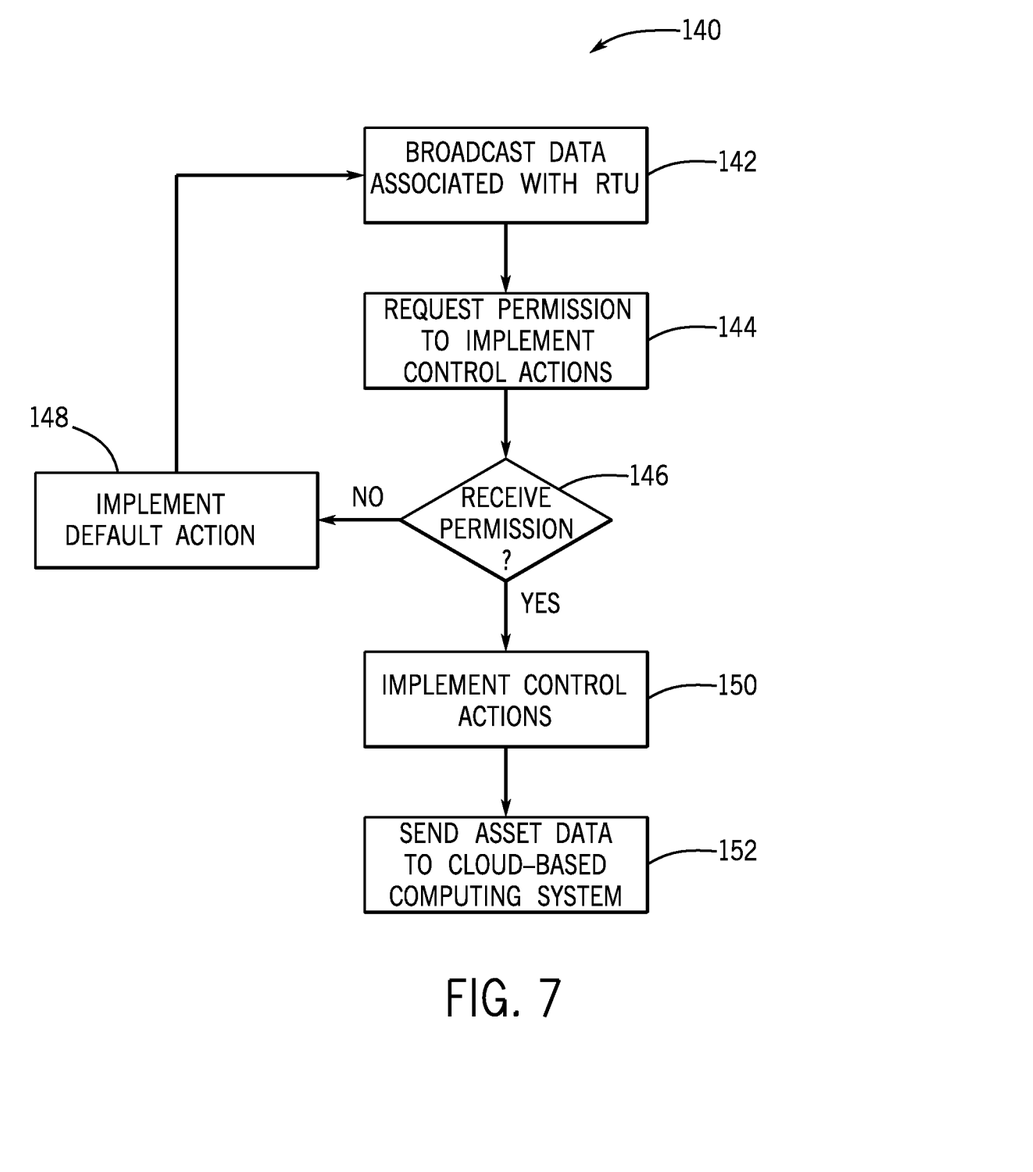
FIG. 7 illustrates a flow chart of a method for a monitoring device to configure itself, in accordance with embodiments presented herein.

FIG. 7 illustrates a flow chart of a method 140 for a monitoring device to configure itself, in accordance with embodiments presented herein. For the purposes of discussion, the following description of the method 140 will be described as being performed by the RTU 46. However, it should be noted that the method 140 may be performed by any suitable computing device, such as a controller or computing system used to control operations of the industrial devices 16 and 18 of the industrial enterprise 10, the well devices of the hydrocarbon site 30, or the like.

Referring now to FIG. 7, at block 142, the RTU 46 may broadcast data associated with the RTU 46. The data may include information identifying the type of RTU 46, a version of the RTU 46, a software or firmware version of the RTU 46, an asset 112 that the RTU 46 is associated with or stored within, and the like.

At block 144, the RTU 46 may request permission to implement certain control actions for the asset 112 or various operations by the RTU 46. For example, the RTU 46 may request to begin controlling the operations of the asset 112 based on data available to the RTU 46 and the model data 108 stored within the RTU 46. In one embodiment, the RTU 46 may request permission from the cloud-based computing system 12, which may manage the operations of a number of RTUs 46 within the hydrocarbon site 30. In one example, the RTU 46 may request permission to begin controlling the asset 112 in a manner that may affect how other assets within the hydrocarbon site 30 may operate.

In addition to requesting permission for certain control actions, the RTU 46 may request permission to execute certain software applications that may enable the RTU 46 to perform various types of analysis for data received by the RTU 46. In certain embodiments, the application may be a specific application created for the respective RTU 46. That is, the application may be a custom application that may have been designed for the respective RTU 46 in view of the data accessible to the RTU 46.

If, at block 146, the RTU 46 does not receive permission from the cloud-based computing system 12, the RTU 46 may proceed to block 148. At block 148, the RTU 46 may implement a default set of instructions that may cause the RTU 46 to control the asset 112 locally in a manner that may not affect the operation of other assets in other parts of the hydrocarbon site 30. For example, certain operations of the asset 112 may be limited in view of potential affects to other assets 112 operating within the hydrocarbon site 30.

If, however, at block 146, the RTU 46 receives permission to implement the control actions requested in the block 144, the RTU 46 may proceed to block 150. At block 150, the RTU 46 may implement the requested control actions that may affect the operations of other assets 112 in the hydrocarbon site 30.

Additionally, at block 152, the RTU 46 may send data acquired by sensors communicatively coupled to the RTU 46 or associated with a respective asset 112 to the cloud-based computing system 12 in accordance with the model data 108 stored within the RTU 46. Moreover, the RTU 46 may send portions of the model data 108 that may define the cloud services 20 to be provided for the data acquired by the RTU 46. As such, the cloud-based computing system 12 may provide cloud services 20 in accordance with the specifications provided in the model data 108. That is, the cloud-based computing system 12 may begin to receive data from the RTU 46 and begin performing the visualization services 102, the workflow services 104, and the analysis services 106 as per the instructions provided in the model data 108.

Figure 8:
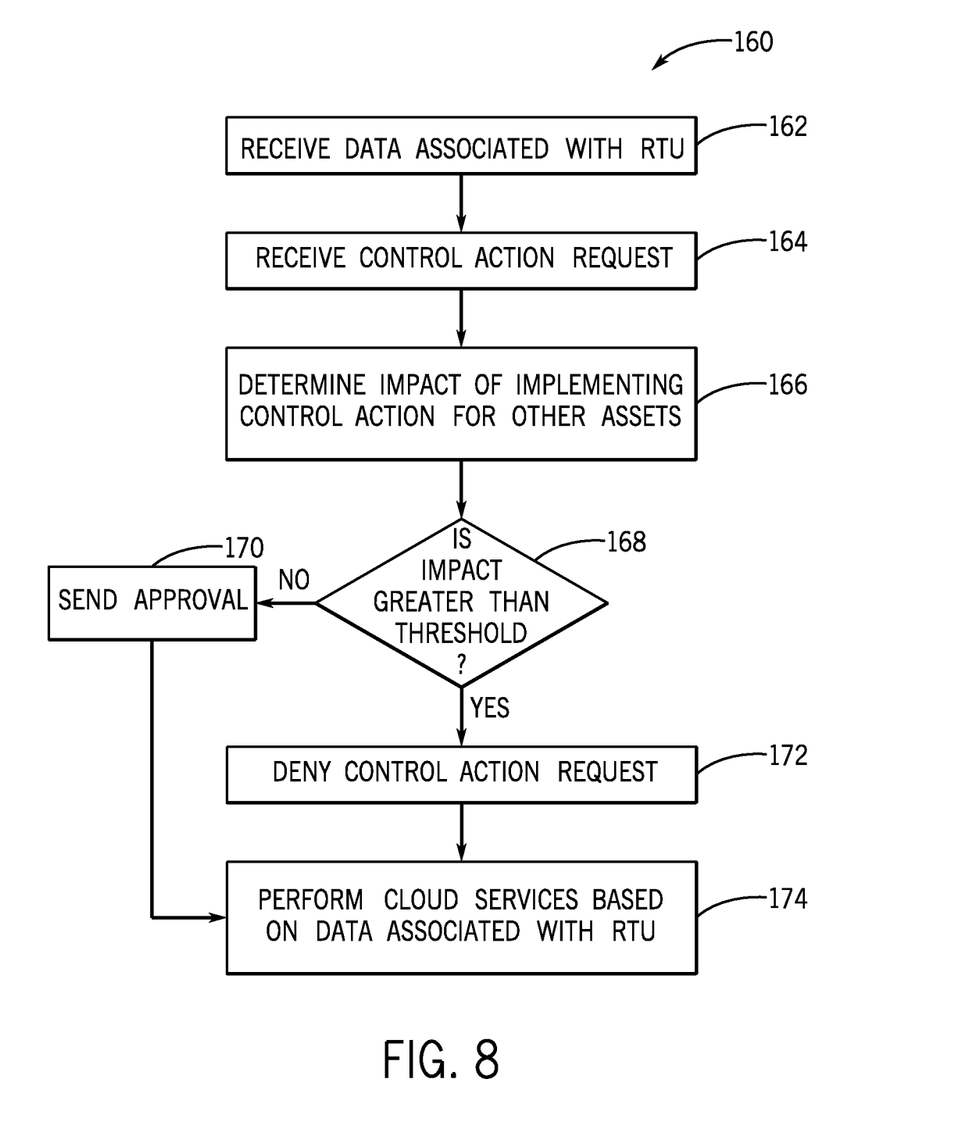
FIG. 8 illustrates a flow chart of a method for assisting a monitoring device to configure itself, in accordance with embodiments presented herein.

FIG. 8 illustrates a flow chart of a method 160 for assisting a monitoring device to configure itself, in accordance with embodiments presented herein. Like the method 140 of FIG. 7, for the purposes of discussion, the following description of the method 160 will be described as being performed by the cloud-based computing system 12 in view of the method 140 of FIG. 7 performed by the RTU 46. However, it should be noted that the method 160 may be performed by any suitable computing device, such as a controller or computing system used to control operations of the industrial devices 16 and 18 of the industrial enterprise 10, the well devices of the hydrocarbon site 30, or the like.

Referring now to FIG. 8, at block 162, the cloud-based computing system 12 may receive the data associated with the RTU 46. The data associated with the RTU 46 may indicate a presence of the RTU 46, the model data 108, data related to the asset 112 that corresponds to the RTU 46, and the like.

At block 164, the cloud-based computing system 12 may receive a control action request from the RTU 46. The control action request may include operations to be performed by the RTU 46, the asset 112, or the like. As mentioned above with regard to the method 140, the control action may include operations that control the asset 112 in a manner that may affect how other assets within the hydrocarbon site 30 may operate.

At block 166, the cloud-based computing system 12 may determine an impact of implementing the control action for other assets 112 in the hydrocarbon site 30. In some embodiments, the cloud-based computing system 12 may evaluate how the various assets 112 within the hydrocarbon site 30 may be affected by the proposed control action. For instance, if the control action is related to controlling the pressure of the network of pipelines 44, assets 112 along the network of pipelines 44 may be affected by the control action. If certain operations being performed by the downstream assets 112 may be negatively affected by the operations being performed by the RTU 46 or the asset 112 associated with the RTU 46, the cloud-based computing system may deny the control action request.

That is, at block 168, the cloud-based computing system 12 may determine that the impact of the control action request received at block 164 is greater than some threshold. The threshold may be related to frustrating a function being performed by another asset 112. In some embodiments, the threshold may be related to decreased efficiency performance of another asset 112, decreased production rate of another asset 112, decreased flow rate of another asset 112, increased processing time for another asset 112, and the like.

If, at block 168, the cloud-based computing system 12 determines that the impact is not greater than the threshold, the cloud-based computing system 12 may proceed to block 170 and send approval of the requested control action to the RTU 46. Upon receiving the approval, the RTU 46 may implement the requested control action.

If, however, at block 168, the cloud-based computing system 12 determines that the impact is greater than the threshold, the cloud-based computing system 12 may proceed to block 172. At block 172, the cloud-based computing system 12 may deny the control action request. That is, the cloud-based computing system 12 may send a denial of the control action request to the RTU 46.

After the cloud-based computing system 12 sends approval or denial of the control action request, the cloud-based computing system 12 may proceed to block 174. At block 174, the cloud-based computing system 12 may perform the cloud services 20 as defined by the model data 108. As such, the cloud-based computing system 12 may perform the visualization services 102, the workflow services 104, the analysis services 106, and the like.

As the cloud-based computing system 12 performs the cloud services, the cloud-based computing system 12 may provide the results of the services to the RTU 46. For example, the cloud-based computing system 12 may send the generated visualizations, as specified by the model data 108, to the RTU 46. The RTU 46 may then display the generated visualizations on the display 82. In one embodiment, other computing devices may access the cloud-based computing system 12 and view the outputs of the cloud services 20.

In one embodiment, if the cloud-based computing system 12 denies the control action request at block 172, the RTU 46 may implement a default control action. After the RTU 46 implements the default control action, the cloud-based computing system 12 may analyze the effects of the default control action on other assets 112 in the hydrocarbon site 30. Based on the effects of the default control action on the other assets 112, the cloud-based computing system 12 may send commands to the RTU 46 and/or the other assets 112 to adjust their respective operations.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A remote terminal unit (RTU) configured to control one or more operations of a well device associated with a hydrocarbon well, wherein the RTU comprises a processor configured to:
   send one or more attributes regarding the RTU, the well device, the hydrocarbon well, or any combination thereof to a cloud-based computing system;
   send model data comprising one or more instructions regarding cloud services to be performed by the cloud-based computing system based on data provided to the cloud-based computing system from the RTU;
   send a request to perform one or more control actions for the operations of the well device to the cloud-based computing system;
   receive an approval of the request via the cloud-based computing system;
   control the operations of the well device based on the control actions in response to receiving the approval of the request, wherein the approval is based at least in part on an effect of the control actions on another well device associated with the hydrocarbon well; and
   send the data to the cloud-based computing system.

2. The RTU of claim 1, wherein the data is acquired by one or more sensors communicatively coupled to the RTU.

3. The RTU of claim 1, wherein the cloud services comprise one or more visualization services, one or more workflow services, one or more analysis services, or any combination thereof.

4. The RTU of claim 3, wherein the visualization services are configured to generate one or more images representative of the data.

5. The RTU of claim 4, wherein the workflow services are configured to control a set of operations for a set of devices within a hydrocarbon site having the hydrocarbon well based on the data.

6. The RTU of claim 1, wherein the one or more attributes comprise an indication of a type of the well device, an identity of the well device, a context of the well device within a hydrocarbon site having the hydrocarbon well, a vendor associated with the well device, a model associated with the well device, a firmware version of the well device, a software application associated with the well device, or any combination thereof.

7. The RTU of claim 1, wherein the model data comprises a set of instructions to be performed by the processor, wherein the set of instructions are configured to cause the RTU to perform one or more default actions.

8. The RTU of claim 1, comprising a storage configured to store the model data, wherein the model data is stored in the storage during manufacturing of the RTU.

9. A cloud-computing system configured to communicatively couple with a remote terminal unit (RTU) configured to monitor and/or control one or more operations of one or more well devices associated with a hydrocarbon well, wherein the cloud-computing system comprises at least one processor configured to:
   receive one or more attributes regarding the RTU, the well devices, the hydrocarbon well, or any combination thereof;
   receive a control action request from the RTU, wherein the control action request comprises a first set of instructions configured to cause the RTU to adjust the operations of the well devices in a first manner;
   receive model data comprising a second set of instructions associated with one or more services to be performed by the cloud-based computing system based on data provided to the cloud-based computing system from the RTU;
   determine whether an impact of adjusting the operations of the well devices in the first manner is greater than a threshold, wherein the threshold is based at least in part on an effect of adjusting the operations of the well devices in the first manner on another well device associated with the hydrocarbon well;
   send a denial of the control request to the RTU when the impact is greater than a threshold; and
   perform the services based on the data.

10. The cloud-computing system of claim 9, wherein the data is acquired by one or more sensors communicatively coupled to the RTU.

11. The cloud-computing system of claim 9, wherein the cloud services comprise one or more visualization services, one or more workflow services, one or more analysis services, or any combination thereof.

12. The cloud-computing system of claim 11, wherein the visualization services are configured to generate one or more images representative of the data.

13. The cloud-computing system of claim 11, wherein the workflow services are configured to control a set of operations for a set of devices within a hydrocarbon site having the hydrocarbon well based on the data.

14. The cloud-computing system of claim 11, wherein the analysis services are configured to predict a performance for a set of devices within a hydrocarbon site having the hydrocarbon well based on the data.

15. The cloud-computing system of claim 11, wherein the analysis services comprises generating one or more plots based on the data.

16. A non-transitory computer-readable medium comprising computer-executable instructions configured to:
   send one or more attributes regarding a remote terminal unit (RTU) configured to control one or more operations of a well device associated with a hydrocarbon well to a cloud-based computing system;
   send model data comprising one or more instructions regarding cloud services to be performed by the cloud-based computing system based on data provided to the cloud-based computing system from the RTU;
   send a request to perform one or more control actions for the operations of the well device to the cloud-based computing system;
   receive an approval of the request via the cloud-based computing system;
   control the operations of the well device based on the control actions in response to receiving the approval of the request, wherein the approval is based at least in part on an effect of the control actions on another well device associated with the hydrocarbon well; and
   send the data to the cloud-based computing system.

17. The non-transitory computer-readable medium of claim 16, wherein the computer-executable instructions are configured to communicatively couple to an intermediary communication component configured to access the cloud-based computing system.

18. The non-transitory computer-readable medium of claim 16, wherein the intermediary communication component comprises a cloud gateway, Ethernet/IP, Data Highway Plus, ControlNet, DeviceNet, or any combination thereof.

19. The non-transitory computer-readable medium of claim 16, wherein the well devices comprises a pumpjack, a submersible pump, a well tree, a wellhead distribution manifold, a separator, storage tank, or any combination thereof.

20. The non-transitory computer-readable medium of claim 16, wherein the data is acquired by one or more sensors communicatively coupled to the RTU.

* * * * *